Nov. 23, 1943.  G. UTZ  2,335,091

FLUID TRANSMISSION

Filed Jan. 30, 1943

INVENTOR.
GEORGE UTZ
BY John F. Stark
ATTORNEY

Patented Nov. 23, 1943

2,335,091

UNITED STATES PATENT OFFICE 2,335,091

FLUID TRANSMISSION

George Utz, Maple Heights, Ohio, assignor to Eaton Manufacturing Company, Cleveland, Ohio, a corporation of Ohio Application January 30, 1943, Serial No. 474,101

11 Claims. (Cl. 103—115)

This invention relates to fluid transmissions in general, and, more particularly, concerns a blade wheel structure in a hydraulic transmission of the so-called torque converter type as used in conjunction with motor-driven vehicles and the like.

It is an object of the present invention to provide an improved blade wheel construction capable of manufacture at relatively low cost and of relatively light weight, as distinguished from die cast blade wheels, without sacrificing the desired requisite strength and resistance to objectionable distortion.

In carrying out the foregoing object of the present invention a novel blade wheel structure is fabricated principally from sheet metal stampings which are secured against displacement by the circulating fluid medium. A minimum number of metal stampings are employed in the present construction to form the blades and blade covers or retaining ring structures, these stampings being fashioned and assembled in a novel manner for attaining the objects set forth.

Another object of the present invention is the provision of a novel and improved blade wheel used in hydraulic power transmitting devices, and wherein the blades per se and their retaining means are made separate from the hub structure and may be securely and permanently connected thereto in any convenient manner.

Further and other objects and advantages of the present invention relate to certain details of construction and combinations and arrangements of parts about to be described, with reference to the drawing forming a part of this specification, and which are more particularly pointed out and claimed in the appended claims.

In the drawing like reference characters refer to corresponding parts throughout the several views and in which.

Figure 2:
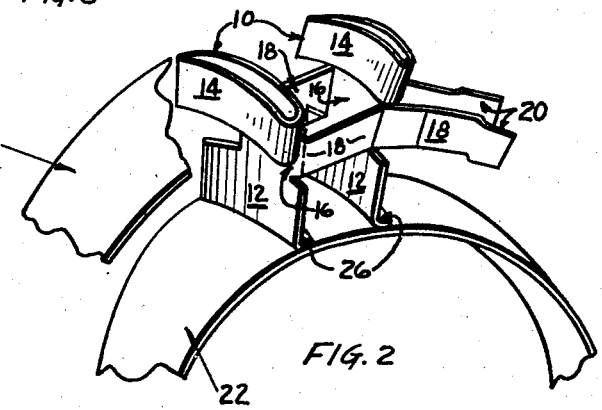
Fig. 2 is a perspective view of a blade wheel and incorporating blades therein as in Fig. 1.
Figure 1:
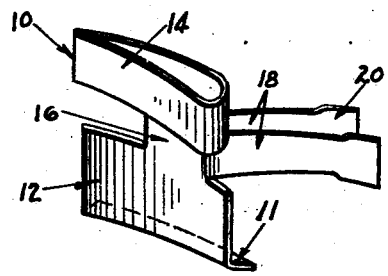
Fig. 1 is a perspective view of a blade with a plurality of unlike blade sections removed from the blade wheel of Fig. 2 and which embodies the present invention.

Referring to the drawing, Figs. 1 and 2 show one embodiment of a blade with a plural blade portion and its incorporation into a blade wheel structure. This blade wheel structure is suitable for use in the hydraulic power transmission devices disclosed in the Robert C. Russell, Patent Nos. 2,298,648 and 2,298,649, issued October 13, 1942, for "Hydraulic transmission," and only that part of the transmission which is necessary to a complete understanding of the present invention is herein shown and described. For a description of the entire transmission reference may be had to the identified patents.

The perspective view of a portion of the blade wheel shown is designed for use in a three-element type transmission as shown in the identified Russell patents, and, more particularly is designated for use as the intermediate or turbine wheel interposed between the impeller wheel and reaction wheel thereof. Although the construction shown in the said Russell patents is generally referred to as a transmission of the three-element type, provision is made for connecting the reaction wheel thereof to the impeller wheel in which event the said transmission operates as a two-element hydraulic transmission, ordinarily referred to as a fluid clutch, all as is fully explained in the said patents.

The main body portions of the impellers or blades 10 consist of a plurality of spaced blades 12 and 14 separated by an intermediate portion 16, arranged to be provided with integral arm means 18 of predetermined length for a desired spacing between adjacent blades, or to be confined between a separate retaining or core ring, hereinafter described with respect to Figs. 5 and 6 and the blade elements shown in Figs. 4 and 7. Such blades 10 may be formed of relatively light weight sheet-metal blanks stamped and folded up into a blade with spaced fluid passage forming vane sections suitable shaped, and then appropriately anchored and braced for rigidity against fluid distortion to impart the desired movement and direction to the fluid, as distinguished from heretofore known relatively heavy and expensive die castings. Inner and outer concentrically spaced annular sheet-metal retaining rings 22 and 24, respectively, are arranged for reception of the blades 10 circumferentially spaced therebetween and substantially radially disposed, as shown in Fig. 2. In order to impart rigidity to the sheet-metal blades against fluid distortion and to permanently anchor them in place, any suitable means may be employed such as spot welding, or the well known hydrogen copper brazing process. In such process the parts are assembled together and held or positioned in their final relative positions, introduced into a furnace with a reduced or inert atmosphere, a ring of copper spread over the joints to be united, and then by capillary attraction the melted copper is dispersed between the adjacent meeting lines of the parts.

Figure 3:
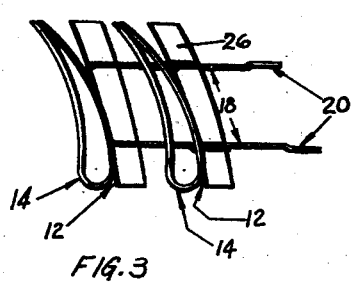
Fig. 3 is a top plan view of the blade wheel of Fig. 2 with the outer cover or shroud ring removed to reveal details thereof.

To assist in such an operation the arms 18 are spread slightly adjacent their outer free ends, as at 20, to nest or telescope with successive blades 10 and to provide a predetermined spacing between the blades, as best shown in Fig. 3. A foot or shoe portion 26 is folded up at approximately a right angle to the lower end of the inner blade section 12, of each blade 10, to provide a support and anchoring means for spot welding the blade or otherwise securing the element, as aforementioned, to the inner sheet-metal retaining ring 22. It will be apparent the radially outer ends of the blades 10 could be formed and anchored in a like manner, or without such connecting means, as in this instance, be copper hydrogen brazed to the outer retaining ring 24. Alternatively, the outer retaining ring may be shrink-fitted over the periphery of the circumferentially spaced and radially disposed sheet-metal blades which have been previously mounted on the inner retaining ring and rigidly braced at their intermediate portions by the arm means 18, previously mentioned, or the intermediate core ring to be described. By suitable bracing of the blades at their mid sections and anchoring of the bases to the inner retaining ring it has been found the outer shroud ring may be omitted in cases where the blade wheel is closely confined around its outer periphery in a cover structure.

In the blade shape shown in Fig. 1 and incorporated in the blade wheel of Figs. 2 and 3 the outer fluid passage forming blade section 14 has been folded up to form a thickened airfoil shape with a rounded cambered leading edge and a narrow relatively sharp pointed trailing edge, also commonly known as a tear drop shape. The radially inner fluid passage forming blade section 12 is crowned into a thin concavo-convex vane of a single metal thickness. Such variations in the spaced outer and inner fluid passage forming sections is a matter of choice and design to meet the individual operating characteristics of the hydraulic power transmitting device in which it may be employed. In this instance, since it may be used in the three-element transmissions of the aforementioned Russell patents, has been selected to impart the desired reaction to the working fluid entering the outer turbine blade from the impeller wheel whence it is then passed to the reaction wheel and through it back to the inner blades of the turbine wheel and finally to the initial impeller wheel, all as fully described in said patents.

Figure 5:
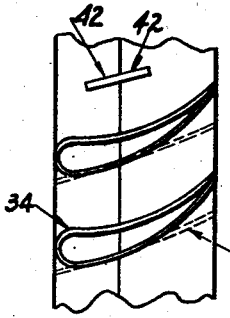
Fig. 5 illustrates a plan view of a portion of a blade wheel embodying the blades and its blade portions shown in Fig. 4.
Figure 6:
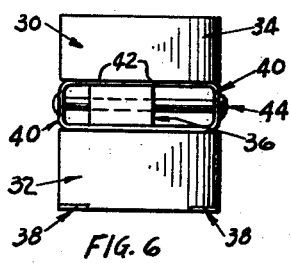
Fig. 6 is a sectional elevational view through the blade wheel of Fig. 5 to reveal details thereof.
Figure 4:
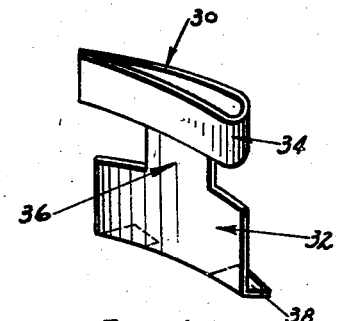
Fig. 4 is a perspective view, similar to Fig. 1, of a modified sheet-metal blade construction also according to the teaching of this invention.
Figure 7:
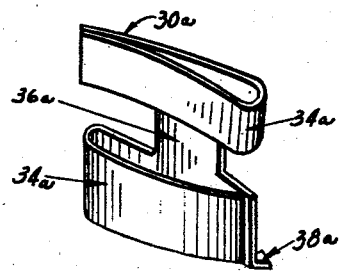
Fig. 7 is a perspective view, similar to Figs. 1 and 4, of a further modified sheet-metal blade construction.

In the turbine wheel and blade construction shown in Figs. 5 and 6, which may have the blade elements of Figs. 4 or 7 incorporated therein, a blade 30 is used which has a slightly altered form of spaced fluid passage forming blade sections 32 and 34 separated by an intermediate portion 36. In this instance, the same inner and outer annular sheet-metal retaining rings 22 and 24, respectively, as previously described, are used and right angled feet 38, arranged to be anchored to the inner retaining ring 22, are shown. However, the intermediate portion 36, of the blades 30, constitute a flat generally rectangular section, which separates the inner and outer blade sections, and around which are fitted identical halves of a generally semi-toroidal core ring 40 that include complementary matching slotted openings 42, extending from the open ended U-like face thereof, to receive and lock the intermediate portions 36 in predetermined spaced circumferential position, while at the same time imparting rigidity thereto at their mid-points as best shown in Fig. 6. Any suitable means for permanently locking the core-ring halves 40 such as the rivets 44 may be used.

In the turbine wheel just described, with the core ring 40, the separate sheet-metal elements may be stamped and folded up into the desired shape from blanks, and united into a permanent assembly rigid against fluid distortion, all in a manner as previously described, although in this instance it will be apparent the arms 20, of the intermediate section 16 of the blade 10, have been omitted and the sheet-metal core ring 40 substituted. The component parts may then be spot welded at the necessary points and the outer retaining ring shrink-fitted over the periphery of the several blades, or copper-hydrogen brazed, as explained with reference to Fig. 2.

In Fig. 7 is shown a further modified form of blade 30a formed from a sheet-metal blank which is stamped and folded up into a shape as illustrated. The blade shape 30a is somewhat similar to the blade element 30, and is illustrated as adaptable for use in the turbine wheel of Figs. 5 and 6, but, in this case, the spaced inner and outer fluid passage forming blade sections 32 and 34 are folded up into identical generally thickened airfoil shapes 34a disposed in reverse relation to each other. This slight variation of blade section is illustrative of the varied sections which may be utilized to secure individual operating characteristics in the hydraulic power transmitting device in which it may be employed according to service use. Obviously the blade element 30a may be blanked out from a sheet-metal stamping in which arm 18, of the blade in Fig. 1, are not sheered off and thus adapt such modified blade structure for the vaned wheel of Fig. 2.

The foregoing description is illustrative of representative embodiments of the teachings of the present invention incorporating, among other things, the objects and advantages of the invention first enumerated. It is not intended to be limited, however, to the specific embodiments disclosed which are merely for purposes of illustration, as many formal modifications and mechanical equivalents will now be suggested to those skilled in the art, and in actual practice, which are considered to come within the spirit and substance of the broad concept of the invention as defined by the scope of the following claims.

What I claim is:

1. A blade wheel for an hydraulic power transmitting device, said blade wheel comprising annular sheet-metal retaining means mounting circumferentially spaced substantially radially extending blades, said blades each consisting of sheet-metal elements stamped or formed into radially spaced inner and outer fluid passage forming sections separated by an intermediate portion, and each of said blades including means to be autogenously united to said retaining means.

2. A blade wheel for an hydraulic power transmitting device, said blade wheel comprising concentrically spaced inner and outer annular sheet-metal retaining members connected by circumferentially spaced substantially radially extending blades, said blades each consisting of sheet-metal elements stamped or formed into radially spaced inner and outer blade sections separated by an intermediate portion, said blade section comprised of a radial outer fluid passage forming blade section folded into a thickened airfoil shape and a radial inner fluid passage forming blade section of a thin cambered concavo-convex cross-section, and each of said blades including means to be autogenously united to said connected inner and outer retaining members.

3. A blade wheel for an hydraulic power transmitting device, said blade wheel comprising concentrically spaced inner and outer annular sheet-metal retaining members connected by circumferentially spaced substantially radially extending blades, said blades each consisting of sheet-metal elements stamped or formed into radially spaced inner and outer fluid passage forming sections separated by an intermediate portion, said intermediate portion of said blades each including spaced arms at laterally or transversely opposite free edges thereof extended normally therefrom for union with a complementary portion of a successive blade to provide a predetermined spacing therebetween, and each of said blades including means to be autogenously united to said connected inner and outer retaining members.

4. A blade wheel for an hydraulic power transmitting device, said blade wheel comprising concentrically spaced inner and outer annular sheet-metal retaining members connected by circumferentially spaced substantially radially extending blades, said blades each consisting of sheet-metal elements stamped or folded into radially spaced inner and outer fluid passage forming sections separated by an intermediate portion, said blade sections comprised of a radial outer fluid passage forming section defining a thickened airfoil shape and a radial inner fluid passage forming section defining a thin cambered concavo-convex cross-section, said intermediate portion of said blades each including spaced arms at the opposite free edges thereof extended normally therefrom for union with a complementary portion of a successive blade to provide a predetermined spacing therebetween, and each of said blades including means to be autogenously united to said connected inner and outer retaining members.

5. A blade wheel for an hydraulic power transmitting device, said blade wheel comprising concentrically spaced inner and outer annular sheet-metal retaining members connected by circumferentially spaced substantially radially extending blades, said blades each consisting of sheet-metal elements stamped or folded into radially spaced inner and outer fluid passage forming sections separated by an intermediate portion, said blade sections each comprised of sections folded into a thickened airfoil shape with the leading and trailing edges thereof disposed in reverse relation, and each of said blades including means for autogenous union to said connected inner and outer retaining members.

6. A blade wheel for an hydraulic power transmitting device, said blade wheel comprising concentrically spaced inner and outer annular sheet-metal retaining members connected by circumferentially spaced substantially radially extending blades, said blades each consisting of sheet-metal elements stamped or folded into radially spaced inner and outer fluid passage forming sections separated by an intermediate portion, means for rigidly anchoring the intermediate portions of said blades in spaced relation consisting of an annular two-part sheet-metal ring each of semi-toroidal cross-section with complementary slots for reception in fixed position of said intermediate portions of the blades therebetween, and each of said blades including means to be autogenously united to said connected inner and outer retaining members.

7. A blade wheel for an hydraulic power transmitting device, said blade wheel comprising an annular supporting member, a plurality of radially disposed blades each having radially spaced inner and outer fluid passage forming sections separated by an intermediate portion, said blades integrally bonded at their radial inner margins to said supporting member, means for rigidly anchoring each of said blades in predetermined spaced relation at their intermediate portion to successive blades, and an annular outer cover ring or shroud autogenously united to the radial outer margins of said blades.

8. A turbine wheel for use in a three-element fluid power transmitting device including an impeller wheel, a turbine wheel, and a reaction wheel, wherein said turbine wheel is interposed between said impeller and reaction wheels for conveying fluid therefrom and thereto, respectively, in one direction of fluid flow, and in the opposite order in the return direction of fluid flow; said turbine wheel comprising concentrically spaced inner and outer annular sheet-metal retaining rings with blades radially disposed therebetween, said blades each consisting of sheet-metal elements folded into radially spaced inner and outer fluid passage forming blade sections separated by an intermediate portion, said intermediate portion having laterally spaced arms, defining an opening between the inner and outer fluid passage forming blade sections, and extended normal thereto for connection with successive intermediate blade arm portions to provide predetermined circumferential blade spacing, and each of said blades adapted to be autogenously united with the concentric inner and outer retaining rings.

9. A blade wheel for an hydraulic power transmitting device, said blade wheel comprising circumferentially spaced substantially radially extending blades, said blades each consisting of sheet-metal elements stamped or folded into radially spaced inner and outer blade sections separated by an intermediate portion, said intermediate portion of said blades each including spaced arms at laterally or transversely opposite free edges thereof extended normally therefrom for union with a complementary portion of a successive blade to provide a predetermined spacing therebetween, and said blades integrally bonded at the over-lapping points of said arms.

10. As a new article of manufacture a sheet-metal blade element for use in a blade wheel of the class described, said blade element consisting of a sheet-metal blank stamped and folded up into an element with spaced fluid passage forming blade sections of a shape adapted to impart desired movement to fluid that may be passed thereover and separated by an intermediate portion arranged to impart rigidity between said blade sections and for predetermined spaced anchoring with complementary portions of other blade elements, and said blade element including means for connection with a retaining ring.

11. As a new article of manufacture a sheet-metal blade element for use in a blade wheel of the class described, said blade element consisting of a sheet-metal blank stamped and folded up into an element with spaced fluid passage forming blade sections of a shape adapted to impart desired movement to fluid that may be passed thereover and separated by an intermediate portion arranged to impart rigidity between said blade sections and for reception of connecting means with complementary portions of other blade elements, and said blade element adapted to be connected with a retaining ring.

GEORGE UTZ.